March 10, 1925.  
W. F. GROENE  
1,528,973  
COMBINED BRAKE AND CLUTCH DEVICE  
Filed May 23, 1924 2 Sheets-Sheet 1

Inventor  
WILLIAM F. GROENE,  
By Murray and Zugelter  
Attorneys

March 10, 1925.

W. F. GROENE 1,528,973

COMBINED BRAKE AND CLUTCH DEVICE

Filed May 23, 1924  2 Sheets-Sheet 2

Inventor
WILL M. F. GROENE,

By Murray and Gugelter
Attorneys

Patented Mar. 10, 1925.

1,528,973

UNITED STATES PATENT OFFICE.

WILLIAM F. GROENE, OF CINCINNATI, OHIO, ASSIGNOR TO THE R. K. LEBLOND MACHINE TOOL COMPANY, OF CINCINNATI, OHIO, A CORPORATION OF DELAWARE.

COMBINED BRAKE AND CLUTCH DEVICE.

Application filed May 23, 1924. Serial No. 715,486.

*To all whom it may concern:*

Be it known that I, WILLIAM F. GROENE, a citizen of the United States of America, and a resident of Cincinnati, in the county of Hamilton and State of Ohio, have invented a new and useful Improvement in a Combined Brake and Clutch Device, of which the following is a specification.

My invention relates to devices of the type disclosed in my Patent No. 1,474,112.

An object of my invention is to provide a simple structure for providing a relatively large frictional face for effecting prompt and efficient braking action.

These and other objects are attained by the means described herein and disclosed in the accompanying drawings, in which.

Figure 1:
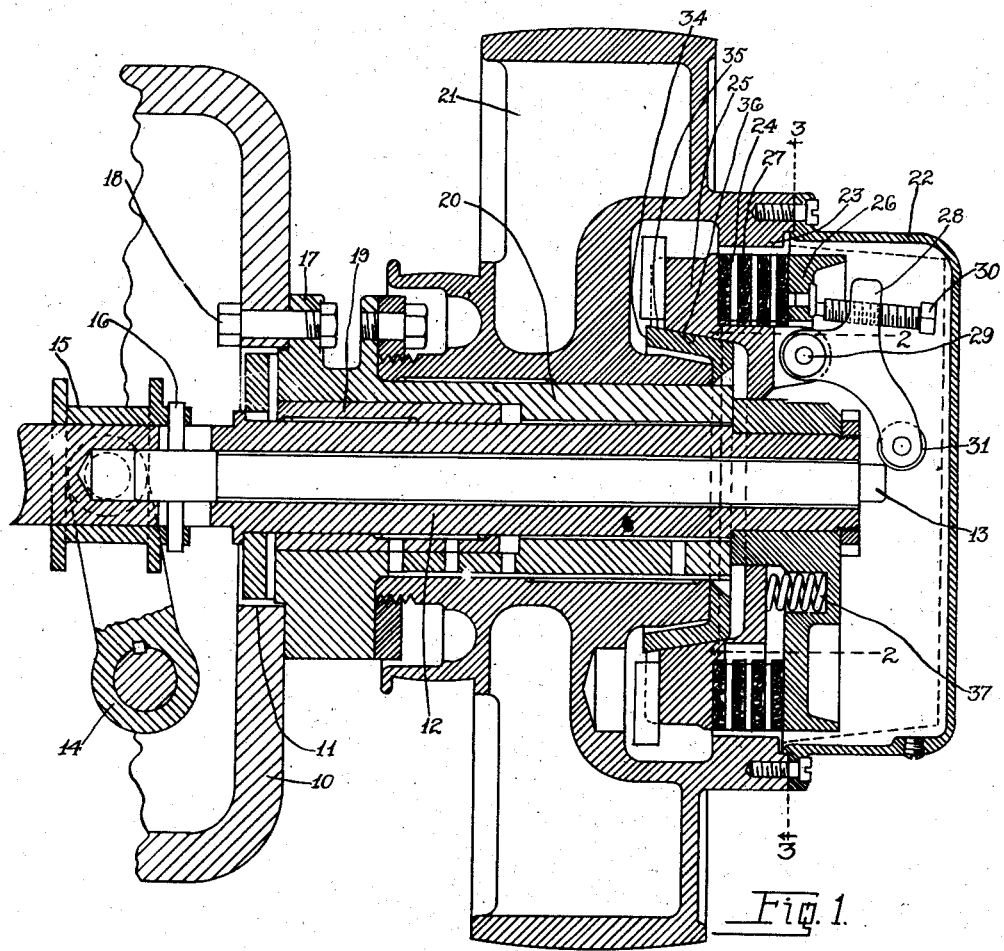
Fig. 1 is a sectional view through a combined braking clutch structure embodying my invention.
Figure 2:
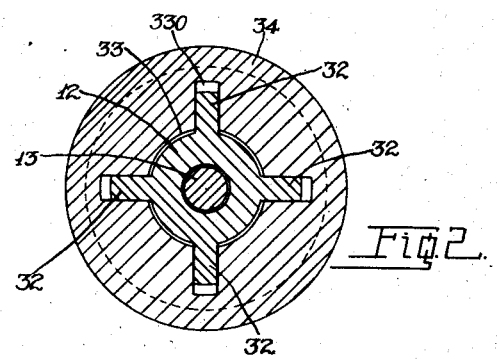
Fig. 2 is a sectional view on line 2—2 of Fig. 1 showing a friction cone forming part of my invention.
Figure 3:
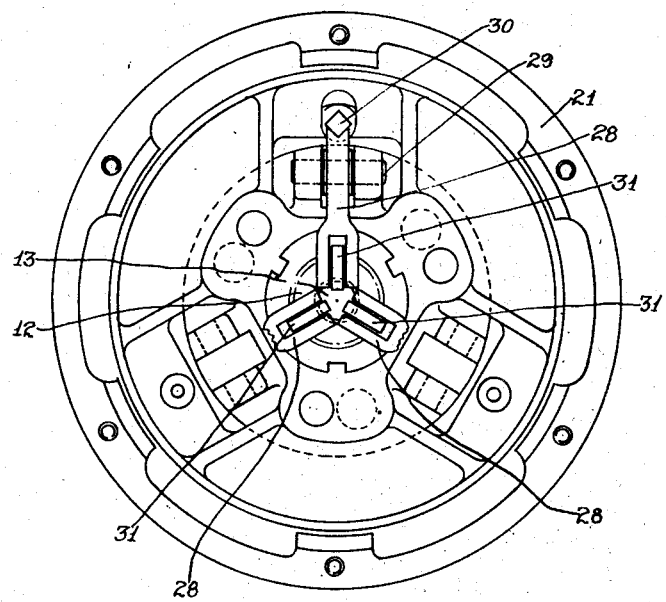
Fig. 3 is an elevational view on line 3—3 of Fig. 1, parts being broken away.
Figure 4:
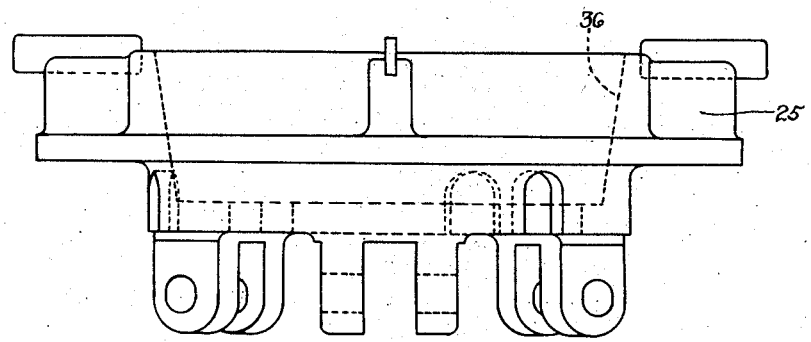
Fig. 4 is an enlarged view of a friction cone forming a detail of my invention.

The housing 10 is fixed and may represent any portion of a machine tool to which a device embodying my invention may be applied. The housing is provided with an aperture 11 through which the shaft 12 extends. The shaft 12 is tubular and within the bore thereof is disposed a shift bar 13 that may be longitudinally actuated by a suitable fork 14 operating upon the spool 15, which spool is reciprocally mounted upon shaft 12 and which is pinned to the shift rod 13 by means of the pin 16, all of which is in accordance with the general practice in the art. The housing 10 has secured upon it a block 17 by any suitable means such as bolts 18 and the block 17 is provided with a bore within which is disposed a sleeve 19 that serves as a bearing for the shaft 12. The block 17 carries a sleeve like extension 20 that serves as a bearing for the pulley 21. The pulley 21 carries an end cap 22 that controls access to the various elements disposed at the end of the structure shown in Fig. 1. The pulley 21 has driving lugs 23 formed on it, which lugs are engaged by the teeth of the toothed rings 24 disposed between the friction collar 25 and the friction plate 26. The friction collar and the friction plate are adapted to revolve with the shaft 12. Between the toothed rings 24 are disposed friction rings 27. A lever 28 adapted to be operated by means of the shift rod 13 has a pivotal mounting 29 upon the friction collar 25 and carries an adjustable screw 30 that bears upon the friction plate 26. The lever 28 carries a roller 31 that is engaged by the rod 13. From the foregoing it will be evident that if the rod 13 be moved toward the right, see Fig. 1, the action thereof resolves itself into a movement of the friction collar and friction plate such that said collar and plate bind the friction rings 27 and the toothed rings 24 so that motion is transmitted between the pulley 21 and the shaft 12. The sleeve like extension 20 is provided at its end with lugs 32 that lodge in extensions 320 of aperture or bore 33 formed in the central or hub portion of the brake cone 34. The cone 34 is provided with an extended external conical face 35 upon which the internal conical face 36 of the friction collar 25 may engage. Springs 37 yieldingly resist compression action of the friction collar and friction plate and also yieldingly retain the conical face of the friction collar in engagement upon the conical face 35 of the friction cone 34.

It has been explained how motion is transmitted between the pulley 21 and the shaft 12. When the shift rod 13 is moved toward the left, see Fig. 1, the springs 37 move the friction collar and friction plate apart so that the driving connection between the pulley and the shaft is severed while at the same time the friction collar is moved into braking engagement with the cone 34.

What I claim is:

1. In a combined clutch and brake mechanism the combination with a driven shaft, of a drive pulley mounted concentrically with the driven shaft, means to impart the motion of the pulley to the driven shaft and comprising a lug formed on the pulley, friction rings engaging the lug, a friction plate and a friction collar mounted upon the driven shaft, means to relatively move the friction plate and friction collar from and into clamping engagement upon the friction rings, a sleeve associated with the driven shaft and a brake disc mounted on the sleeve and provided with a conical friction face disposed radially outward from the sleeve and upon which face the friction collar may engage when the clamping engagement is broken.

2. In a combined brake and clutch mechanism the combination with a driven shaft, of a pulley mounted concentrically with the driven shaft, friction rings mounted on the drive pulley, a friction collar and a friction plate on the driven shaft adapted to be clamped upon the friction rings, a brake sleeve mounted upon the driven shaft and fixedly mounted on the machine to which the mechanism is applied, the brake sleeve being provided with lugs at its one end, a brake disc provided with apertures for receiving the lugs on the brake sleeve and having a friction face disposed radially outward from the brake sleeve and upon which friction face the friction collar may engage, and means adapted to normally hold the friction collar in frictional engagement with the brake disc.

3. In a combined clutch and brake mechanism the combination with a driven shaft, of a fixed brake sleeve mounted concentric to the driven shaft, the brake sleeve provided at its one end with radially extending lugs, a friction disc having a central aperture with radial extensions for the reception of the radially extending lugs on the brake sleeve, a drive pulley mounted on the brake sleeve, a friction collar reciprocally mounted upon the driven shaft and extending over the friction disc and adapted to engage the friction disc, means to normally hold the friction collar in engagement with the friction disc and means to release the friction collar from the friction disc and to move it into engagement with the drive pulley.

In testimony whereof, I have hereunto subscribed my name this 12th day of May, 1924.

WILLIAM F. GROENE.